United States Patent
Hoelzel et al.

(10) Patent No.: US 11,892,012 B2
(45) Date of Patent: Feb. 6, 2024

(54) ADJUSTABLE GUIDE VANE WITH CONVEXLY SHAPED, RADIALLY INNER STORAGE SECTION FOR A GAS TURBINE, IN PARTICULAR AN AIRCRAFT GAS TURBINE

(71) Applicant: MTU Aero Engines AG, Munich (DE)

(72) Inventors: Andreas Hoelzel, Herrsching (DE); Christian Roth, Munich (DE); Franz Prieschl, Reichertshausen (DE); Josef Eichner, Scheyern (DE); Mike Mosbacher, Munich (DE); Vitalis Mairhanser, Sigmertshausen (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/052,924

(22) Filed: Nov. 6, 2022

(65) Prior Publication Data
US 2023/0235752 A1    Jul. 27, 2023

(30) Foreign Application Priority Data
Nov. 8, 2021  (DE) ...................... 10 2021 129 033.3

(51) Int. Cl.
| F04D 29/56 | (2006.01) |
| F01D 17/16 | (2006.01) |
| F04D 19/02 | (2006.01) |
| F02C 3/06  | (2006.01) |

(52) U.S. Cl.
CPC ......... *F04D 29/563* (2013.01); *F01D 17/162* (2013.01); *F04D 19/022* (2013.01); *F02C 3/064* (2013.01)

(58) Field of Classification Search
CPC .... F04D 19/022; F04D 29/563; F01D 17/162; F02C 3/064
See application file for complete search history.

(56) References Cited

U.S. PATENT DOCUMENTS

| 10,294,814 B2* | 5/2019 | Wulf .................... F04D 29/563 |
| 2020/0072073 A1* | 3/2020 | Snider .................. F04D 29/563 |

FOREIGN PATENT DOCUMENTS

| DE | 12 44 479 B | 7/1967 |
| DE | 10 2009 038623 A1 | 3/2011 |
| DE | 10 2012 220 249 A1 | 5/2014 |

(Continued)

*Primary Examiner* — Audrey B. Walter
(74) *Attorney, Agent, or Firm* — Hinckley, Allen & Snyder, LLP; David R. Josephs

(57) ABSTRACT

An adjustable guide vane for a compressor, in particular a high-pressure compressor, of a gas turbine, in particular an aircraft gas turbine is described, the vane comprising a radially outer bearing section, a radially inner bearing section, and a vane section, which extends in the radial direction between the outer bearing section and the inner bearing section, wherein the outer and the inner bearing sections are designed in such a way that the adjustable guide vane can be taken up rotatably about a vane axis in the compressor, and wherein the radially inner bearing section is configured like a journal (cone-shaped) and has a lateral surface that is formed circumferentially about the vane axis, the lateral surface being of convex shape. In this way, it is provided that the radius of curvature of the convex lateral surface is at least double the maximum diameter of the bearing section.

6 Claims, 2 Drawing Sheets

(56) References Cited

FOREIGN PATENT DOCUMENTS

| | | |
|---|---|---|
| DE | 10 2018 203 442 A1 | 9/2019 |
| DE | 10 2019 122 851 A1 | 3/2020 |
| EP | 1 031 703 A2 | 8/2000 |
| EP | 2 884 054 A1 | 6/2015 |
| EP | 2884055 A1 * | 6/2015 ........... F01D 17/162 |
| EP | 3 315 729 A1 | 5/2018 |
| EP | 2 817 490 B1 | 11/2018 |
| RU | 2157925 C2 | 10/2000 |
| RU | 2 614 456 C1 | 3/2017 |

\* cited by examiner

ADJUSTABLE GUIDE VANE WITH CONVEXLY SHAPED, RADIALLY INNER STORAGE SECTION FOR A GAS TURBINE, IN PARTICULAR AN AIRCRAFT GAS TURBINE

BACKGROUND OF THE INVENTION

The present invention relates to an adjustable guide vane for a compressor, in particular a high-pressure compressor, of a gas turbine, in particular an aircraft gas turbine, said vane comprising a radially outer storage or bearing section, a radially inner bearing section, and a vane section, which extends in the radial direction between the outer bearing section and the inner bearing section, wherein the outer and the inner bearing sections are designed in such a way that the adjustable guide vane can be taken up in the compressor so that it is rotatable about a vane axis, and wherein the radially inner bearing section is designed like a journal (cone-shaped) and has a lateral surface that is formed circumferentially around the vane axis, said surface being of convex shape. Further, the invention relates to a gas turbine having a compressor and a plurality of adjustable guide vanes of this kind.

Directional indications such as "axial" or "axially", "radial" or "radially", and "peripheral" are basically to be understood as referred to the machine axis of the gas turbine, as long as a different meaning does not ensue explicitly or implicitly from the context.

Adjustable guide vanes with ball-shaped inner bearing sections are known, for example, from DE 10 2019 122 851 A1 and EP 2 817 490 Bl.

For bearing adjustable guide vanes in compressors of gas turbines, both radially outer as well as radially inner, cylindrical sleeve bearings, particularly in the form of cylindrical drill holes are used as the respective receivers for the bearing sections of the adjustable guide vanes. Additionally, bushings or sleeves can be used as parts subject to wear, wherein such bushings or sleeves are arranged in the path of force transfer between the respective bearing section of the adjustable guide vane and the respective cylindrical sleeve bearing.

It has been shown both for ball-shaped inner bearing sections and for cylindrical inner bearing sections that the force transfer in the region of the inner bearing section can lead to sharply increased point loads or surface loads in the sleeve bearing. In particular, surface loads on the sleeve bearings and the cylindrical storage sections lead to unwanted wear.

SUMMARY OF THE INVENTION

The object that is the basis for the invention is to propose an adjustable guide vane with which the above disadvantages can be reduced or prevented.

In order to achieve this object, an adjustable guide vane and a gas turbine with the features of the present invention are proposed. Advantageous embodiments with appropriate enhancements are discussed in detail below.

Thus, an adjustable guide vane for a compressor, in particular for a high-pressure compressor, of a gas turbine, in particular an aircraft gas turbine, is proposed, the vane having a radially outer bearing section, a radially inner bearing section, and a vane section, which extends in the radial direction between the outer bearing section and the inner bearing section, wherein the outer and the inner bearing sections are designed in such a way that the adjustable guide vane can be taken up in the compressor so that it is rotatable about a vane axis, and wherein the radially inner bearing section is designed like a journal (cone-shaped) and has a lateral surface that is formed circumferentially around the vane axis, the surface being of convex shape. In this way, it is provided that the radius of curvature of the convex lateral surface is at least double the maximum diameter of the bearing section.

By way of such a configuration of the casing surface, the radially inner bearing section has a shaping that makes possible an improved force transfer between the bearing section and the sleeve bearing, particularly in the operation of the compressor during corresponding force effects. In this case, the radius of curvature of the lateral surface is selected high enough that, on the one hand, there is no complete surface contact between lateral surface and bearing, and, on the other hand, there is also no point contact as would be the case for a ball-shaped configuration. The curved lateral surface with large radius makes possible a partial surface contact between the lateral surface and the bearing, in particular during operation and under corresponding force effect, so that the surface load in this region can be optimally distributed.

In the case of the adjustable guide vane, the radius of curvature of the convex lateral surface can be from three times to ten times the maximum diameter of the bearing section. It is possible thereby to form a matching convex curvature of the lateral surface.

Further, in the case of the adjustable guide vane, the convex casing surface can be formed by a plurality of casing surface sections, each having a different radius of curvature. It is thus conceivable that the convex casing surface is formed by a plurality of different radii of curvature that transition into one another, so to speak. For example, it is conceivable that the radius of curvature in a central or middle region is greater than in regions of the inner bearing section or the lateral surface that lie radially further inside or outside.

Further, a gas turbine, in particular an aircraft gas turbine is proposed that has at least one adjustable compressor, particularly an adjustable high-pressure compressor, wherein it is provided that the compressor has a plurality of the above-described adjustable guide vanes that are arranged next to one another in the peripheral direction.

In the case of the gas turbine, the compressor can have a radially inner bearing ring having a plurality of cylindrical drill holes that are arranged next to one another in the peripheral direction, wherein an inner bearing section with convex lateral surface is taken up in each cylindrical drill hole.

Further, the gas turbine can have a radially outer adjustable ring device that is joined with the radially outer bearing sections of the adjustable guide vanes in such a way that all adjustable guide vanes are simultaneously rotatable about their respective vane axis.

It can also be stated relative to the dimensioning of the cylindrical drill hole in the inner bearing ring and the radius of curvature of the lateral surface of the inner bearing section of the adjustable guide vane that the radius of curvature of the lateral surface is at least double the diameter of the cylindrical drill hole, and in particular is three to ten times as much.

BRIEF DESCRIPTION OF THE DRAWINGS FIGURES

The invention will be described below with reference to the appended figures by way of example and not in any limiting manner.

DESCRIPTION OF THE INVENTION

Figure 1:
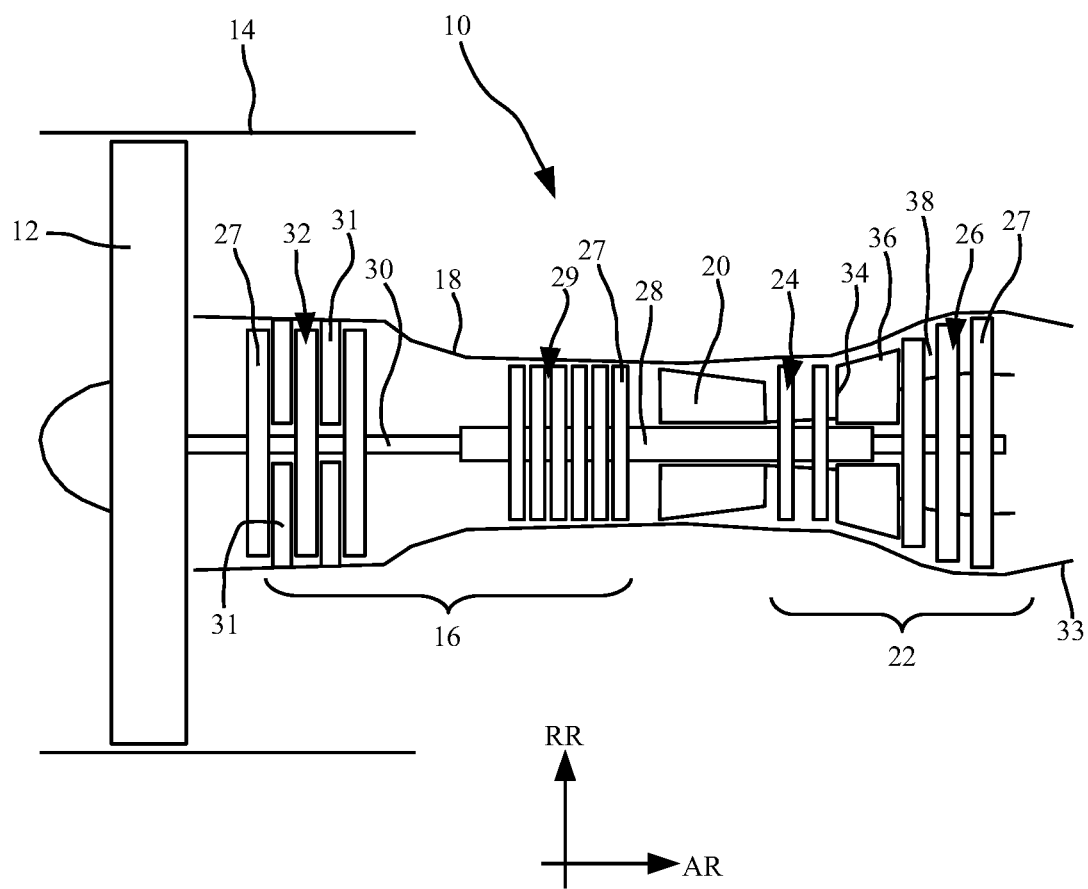
FIG. 1 shows in a simplified schematic illustration a diagram of an aircraft gas turbine.

Schematically and simplified, FIG. 1 shows an aircraft gas turbine 10, which is illustrated as a turbofan engine purely by way of example. The gas turbine 10 comprises a fan 12, which is surrounded by a casing 14, which is simply indicated. In the axial direction AR of the gas turbine 10, a compressor 16 is connected to the fan 12, the compressor being taken up in a simply indicated inner housing 18 and can be designed as a single-stage or a multistage compressor. The combustion chamber 20 is connected to the compressor 16. Hot exhaust gas streaming out from the combustion chamber then flows through the subsequently connected turbine 22, which can be designed as a single-stage or a multistage turbine. In the present example, the turbine 22 comprises a high-pressure turbine 24 and a low-pressure turbine 26. A hollow shaft 28 connects the high-pressure turbine 24 to the compressor 16, in particular a high-pressure compressor 29, so that these are driven or rotated jointly. In the radial direction RR of the turbine, another inner-lying shaft 30 connects the low-pressure turbine 26 to the fan 12 and to a low-pressure compressor 32, so that these are driven or rotated jointly. A thruster 33, which is only indicated here, is connected to the turbine 22.

In the illustrated example of an aircraft gas turbine 10, a turbine midframe 34 is arranged between the high-pressure turbine 24 and the low-pressure turbine 26, and is arranged also around the shafts 28, 30. In its radially outer region 36, hot exhaust gases from the high-pressure turbine 24 flow through said turbine midframe 34. The hot exhaust gas then reaches an annular space 38 of the low-pressure turbine 26. By way of example, rotating blade cascades 27 are illustrated from compressors 29, 32 and turbines 24, 26. Guide vane cascades 31 that are usually present are illustrated only in the compressor 32 by way of example, for reasons of clarity.

The description below of an embodiment of an adjustable guide vane particularly refers to the compressor 16, in particular the high-pressure compressor 29.

Figure 2:
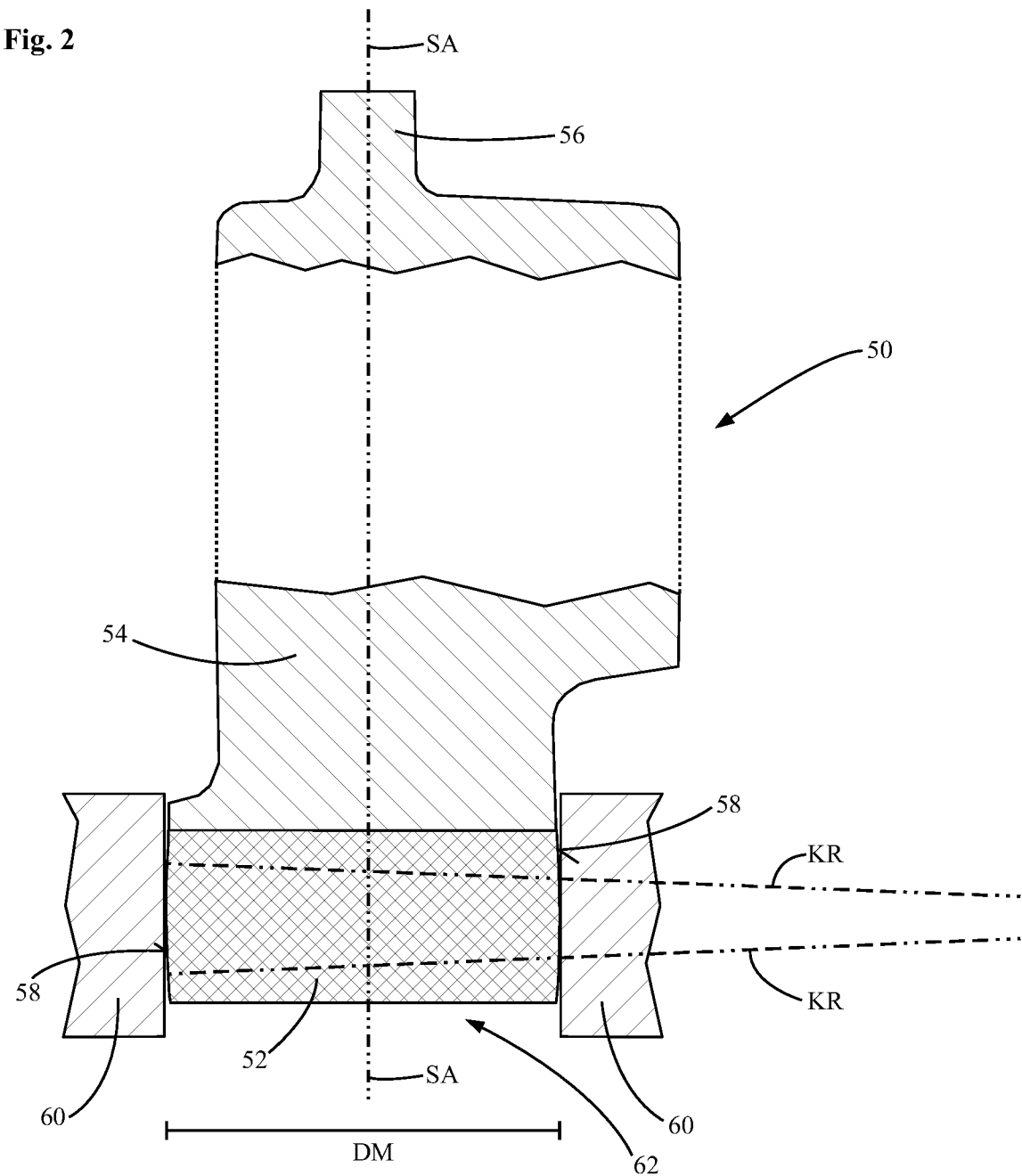
FIG. 2 shows in a simplified and schematic sectional illustration an adjustable guide vane with its radially inner bearing section.

In a simplified and schematic sectional illustration, FIG. 2 shows an adjustable guide vane 50. The adjustable guide vane 50 comprises a radially inner bearing section 52. Radially toward the outside, a vane section connects to the bearing section 52. The vane section in this case extends radially outside up to a radially outer bearing section 56, which is indicated here only very simply.

The outer and inner bearing sections 52, 56 are thus embodied here in such a way that the adjustable guide vane 50 is rotatable about a vane axis SA in the compressor. The radially inner storage section 52 is designed like a journal (cone-shaped) and has a lateral surface 58 that that is formed circumferentially about the vane axis SA, the surface being of convex shape. In this case, the radius of curvature KR of the convex lateral surface 58 is at least double the maximum diameter DM of the bearing section 52.

In FIG. 2, two radii of curvature KR of the lateral surface 58 are indicated by dot-dash lines that do not intersect in FIG. 2 (on the right). In this way, it can be seen that a central point for a circle, whose radius corresponds to the radius of curvature KR, is found outside FIG. 2, and that the radius of curvature KR is clearly greater than the diameter DM of the storage section 52.

The selected diagram illustrates also that the radius of curvature KR of the convex lateral surface 58 can be three to ten times the maximum diameter DM of the bearing section 52.

Although this is not explicitly shown in FIG. 2, the convex lateral surface 58 can also be formed by a plurality of lateral surface sections, each of which has a different radius of curvature. In this case, each of the different radii of curvature fulfill the above-mentioned conditions in relation to the diameter DM of the storage section 52.

In an aircraft gas turbine 10, which is shown in FIG. 1 and which has at least one adjustable compressor, in particular the adjustable high-pressure compressor 29, the compressor 29 can have a plurality of adjustable guide vanes that are arranged next to one another in the peripheral direction, as they have been described above with reference to FIG. 2. For this, the compressor 29 can have a radially inner bearing ring 60 (FIG. 2) with a plurality of cylindrical drill holes 62 that are arranged next to one another in the peripheral direction, whereby an inner bearing section 52 with convex lateral surface 58 is received in each cylindrical drill hole 62. The diameter of a drill hole 62 in this case essentially corresponds to the maximum diameter DM of the bearing section 52, so that, also with respect to the diameter of the drill hole, it is valid that the radius of curvature KR of the lateral surface 58 is at least twice as large as the diameter of the drill hole 62.

What is claimed is:

1. An adjustable guide vane for a high-pressure compressor of an aircraft gas turbine, comprising:
   a radially outer bearing section,
   a radially inner bearing section,
   a vane section, which extends in the radial direction between the outer bearing section and the inner bearing section,
   wherein the outer and the inner bearing sections are configured and arranged so the adjustable guide vane can be taken up rotatably about a vane axis in the compressor, and
   wherein the radially inner bearing section has a cylindrical or plate-shaped base and has a lateral surface that that is formed circumferentially around the vane axis, the lateral surface being of convex shape,
   wherein a radius of curvature of the convex lateral surface is at least double the maximum diameter of the radially inner bearing section.

2. The adjustable guide vane according to claim 1, wherein the radius of curvature of the convex lateral surface is three to ten times the maximum diameter of the radially inner bearing section.

3. The adjustable guide vane according to claim 1, wherein the adjustable guide vane is mounted exclusively over the bearing section on its radially inner-lying side relative to the vane section.

4. An aircraft gas turbine, comprising:
   at least one adjustable high-pressure compressor,
   wherein the high-pressure compressor has a plurality of adjustable guide vanes arranged next to one another in the peripheral direction according to claim 1.

5. The aircraft gas turbine according to claim 4, wherein the compressor has a radially inner bearing ring with a plurality of cylindrical drill holes that are arranged next to one another in the peripheral direction, wherein an inner bearing section with convex lateral surface is taken up in each cylindrical drill hole.

6. The aircraft gas turbine according to claim 4, further comprising a radially outer adjustable ring device that is joined with the radially outer bearing sections of the adjustable guide vanes so that all adjustable guide vanes are simultaneously rotatable about their respective vane axis.

\* \* \* \* \*